United States Patent
Petrecchia et al.

(10) Patent No.: US 9,322,374 B2
(45) Date of Patent: Apr. 26, 2016

(54) ELECTROMAGNETIC FUEL INJECTOR WITH BRAKING DEVICE

(71) Applicant: Magneti Marelli S.p.A., Corbetta (IT)

(72) Inventors: Stefano Petrecchia, Foligno (IT); Massimo Lolli, Bologna (IT); Massimo Mattioli, Calderara Di Reno (IT); Enrico Vezzani, Bologna (IT); Daniele De Vita, Castel San Pietro Terme (IT)

(73) Assignee: MAGNETI MARELLI S.P.A., Corbetta (IT)

( * ) Notice: Subject to any disclaimer, the term of this patent is extended or adjusted under 35 U.S.C. 154(b) by 147 days.

(21) Appl. No.: 14/255,278

(22) Filed: Apr. 17, 2014

(65) Prior Publication Data

US 2014/0312147 A1  Oct. 23, 2014

(30) Foreign Application Priority Data

Apr. 17, 2013 (IT) ................ BO2013A0169

(51) Int. Cl.
*F02M 51/00* (2006.01)
*F02M 61/20* (2006.01)
(Continued)

(52) U.S. Cl.
CPC .............. *F02M 61/20* (2013.01); *B05B 15/008* (2013.01); *F02M 1/14* (2013.01); *F02M 51/061* (2013.01); *F02M 51/0614* (2013.01); *F02M 51/0621* (2013.01); *F02M 51/0671* (2013.01); *F02M 61/188* (2013.01); *F16K 15/16* (2013.01); *F02M 2200/26* (2013.01); *F02M 2200/304* (2013.01); *Y10S 239/90* (2013.01)

(58) Field of Classification Search
CPC .............. F02M 61/20; F02M 51/0614; F02M 51/0621; F02M 51/0671; F02M 61/188; F02M 51/061; F02M 2200/26; F02M 2200/304; F16K 15/16; B05B 15/008; B05B 1/14; Y10S 239/90
USPC ........ 239/575, 585.1, 585.4, 585.5, 900, 590, 239/590.3, 590.5
See application file for complete search history.

(56) References Cited

U.S. PATENT DOCUMENTS

| 6,318,646 B1 | 11/2001 | Mattioli et al. | |
| 2003/0222158 A1* | 12/2003 | Boehland ............... | F02M 45/04 239/585.1 |

(Continued)

FOREIGN PATENT DOCUMENTS

| DE | 202465 | 10/1908 |
| DE | 10 2009 045 728 A1 | 4/2011 |

(Continued)

*Primary Examiner* — Steven J Ganey
(74) *Attorney, Agent, or Firm* — Howard & Howard Attorneys PLLC

(57) ABSTRACT

The present invention relates to a fuel injector. The fuel injector is provided with an injection nozzle, an injection valve, and an electromagnetic actuator. The injection valve has a movable needle to adjust the flow of fuel through the injection nozzle. The electromagnetic actuator is adapted to move the needle between a closing position and an opening position of the injection valve and is provided with a movable plunger which is mechanically connected to the needle and has at least one feeding through hole for the passage of fuel towards the injection nozzle. The plunger is provided with a hydraulic type braking device, which is coupled to the feeding hole and hydraulically dissipates kinetic energy to slow down the opening stroke of the needle when the needle moves towards the opening position of the injection valve.

13 Claims, 6 Drawing Sheets

(51) Int. Cl.
*F02M 51/06* (2006.01)
*B05B 15/00* (2006.01)
*F02M 1/14* (2006.01)
*F16K 15/16* (2006.01)
*F02M 61/18* (2006.01)

(56) References Cited

U.S. PATENT DOCUMENTS

2004/0112993 A1\* 6/2004 Shinogle .............. F02M 57/025 239/585.1
2006/0086829 A1\* 4/2006 Cernoia ............... F02M 61/166 239/585.1
2006/0192035 A1\* 8/2006 Petrone .............. F02M 51/0671 239/900
2008/0156906 A1\* 7/2008 Cagnolati .......... F02M 51/0614 239/585.1

FOREIGN PATENT DOCUMENTS

| EP | 1 369 579 A1 | 12/2003 |
| EP | 1 619 384 A2 | 1/2006 |
| EP | 1 650 428 A2 | 4/2006 |
| EP | 2 508 744 A1 | 10/2012 |

\* cited by examiner

ELECTROMAGNETIC FUEL INJECTOR WITH BRAKING DEVICE

CROSS-REFERENCE TO RELATED APPLICATION

This application is based upon and claims priority to Italian patent application BO2013A000169 filed on Apr. 17, 2013.

BACKGROUND OF THE INVENTION

1. Field of Invention

The present invention relates to fuel injectors and, more specifically, to an electromagnetic fuel injector with a braking device.

2. Description of Related Art

Electromagnetic fuel injectors known in the art (for example, the type described in European patent application EP1619384A2) generally include a cylindrical tubular body having a central feeding channel (which has a fuel conveying function) and ends with an injection nozzle adjusted by an injection valve controlled by an electromagnetic actuator. The injection valve includes a needle, which is moved by the action of the electromagnetic actuator between a closing position and an opening position of the injection nozzle against the bias of a closing spring, which tends to hold the needle in the closing position. The electromagnetic actuator is typically provided with a closing spring which pushes the needle towards the closing position, and with an electromagnet which pushes the needle towards the opening position against the elastic bias generated by the spring.

The electromagnet includes a coil externally arranged in a fixed position about the tubular body, a movable plunger firmly connected to the needle and movably mounted inside the tubular body, and a fixed magnetic pole made of ferromagnetic material; arranged within the tubular body at the coil; and adapted to magnetically attract the plunger. The magnetic pole is centrally perforated and has a central through hole which allows the fuel to flow towards the injection nozzle. The closing spring is arranged inside the central hole and is compressed between a perforated catch body driven into the central hole, and the plunger, so as to push the plunger (and, thus, the needle integral with the plunger) towards the closing position of the injection nozzle.

The manufacturers of Otto cycle heat engines (for example, spark-ignition internal combustion engines) often require increased fuel pressure (even in excess of 50 MPa) so as to improve the mixing of fuel, to support combustion and reduce the generation of black smoke (which indicates poor combustion), and to increase the dynamic performance of the electromagnetic injectors (for example, to increase the response speed of the electromagnetic injectors to commands) in order to inject small amounts of fuel with the goal of fractioning the fuel injection into multiple separate injections, whereby the generation of polluting substances during combustion can be reduced.

In an electromagnetic fuel injector, increasing the fuel feeding pressure causes a proportional increase of the hydraulic forces involved, and thus necessitates the use of stronger closing springs and more powerful electromagnets. In order to increase the power of an electromagnet (for example, to increase the magnetic attraction force generated by the electromagnet), either higher performance materials can be used (but, with a considerable increase in costs which is not normally acceptable by the modern automotive industry), or the size of the electromagnet can be increased. Regardless, an increase in the electromagnet size also causes an increase of the magnetic and mechanical inertia of the electromagnet, which then becomes slower. Specifically, increasing the size of the electromagnet inevitably degrades the dynamic performance of the electromagnet itself.

In order to obtain an increase in the force generated by the electromagnet without degrading the dynamic performance of the electromagnet itself, European patent EP1650428B1 suggests doubling the electromagnet; for example, two small-sized twin electromagnets are used instead of a single large-sized electromagnet.

When the injection valve is closed, there is a force of hydraulic nature which pushes on the shutter and maintains the shutter in the closing position (for example, the higher the fuel feeding pressure, the higher this force). Therefore, in order to open the injection valve, the electromagnetic actuator needs to generate a force on the needle which overcomes the force added to the elastic bias exerted by the closing spring. However, the force suddenly disappears as soon as the injection valve opens, thus the injection valve opens very quickly and violently with an extremely fast movement of the needle. Such a fast, violent opening of the injection valve causes a very steep and often irregular ramp in the initial part (referred to as the "ballistic zone") of the injection law of the injector (for example, the law which relates the actuation time to the injected fuel amount; for example, the driving time).

Because the initial part of the injection law has a very steep and often irregular ramp, correctly controlling the fuel injection is very complex. Moreover, at such a steep ramp, tiny differences in the injection time (for example, in the control time) determine substantial differences in the injected fuel amount.

SUMMARY OF THE INVENTION

It is the object of the present invention to provide an electromagnetic fuel injector which is free from the above-described drawbacks, for example, which allows to stabilize the initial part (for example, the ballistic zone) of the injection law, while being easily and cost-effectively manufactured.

According to the present invention, an electromagnetic fuel injector is provided. The injector includes an injection nozzle and an injection valve having a movable needle to adjust the flow of fuel through the injection nozzle. The injector further includes an electromagnetic actuator to move the needle between a closing position and an opening position of the injection valve. The actuator has at least one electromagnet including a coil, a fixed magnetic armature, and a movable plunger mechanically connected to the needle. The plunger and has at least one feeding through hole for the passage of fuel towards the injection nozzle. The injector also includes a closing spring which tends to hold the needle in the closing position. The injector still further has a tubular supporting body having a central channel which houses the fixed magnetic armature and the movable plunger. The plunger has a braking device of the hydraulic type, which is coupled to the feeding hole and hydraulically dissipates more kinetic energy when the needle moves towards the opening position of the injection valve than when the needle moves towards the closing position of the injection valve, so as to slow down the opening stroke of the needle when the needle moves towards the opening position of the injection valve.

Other objects, features and advantages of the present invention will be readily appreciated as the same becomes better understood after reading the subsequent description taken in connection with the accompanying drawings.

DETAILED DESCRIPTION OF THE INVENTION

Figure 1:
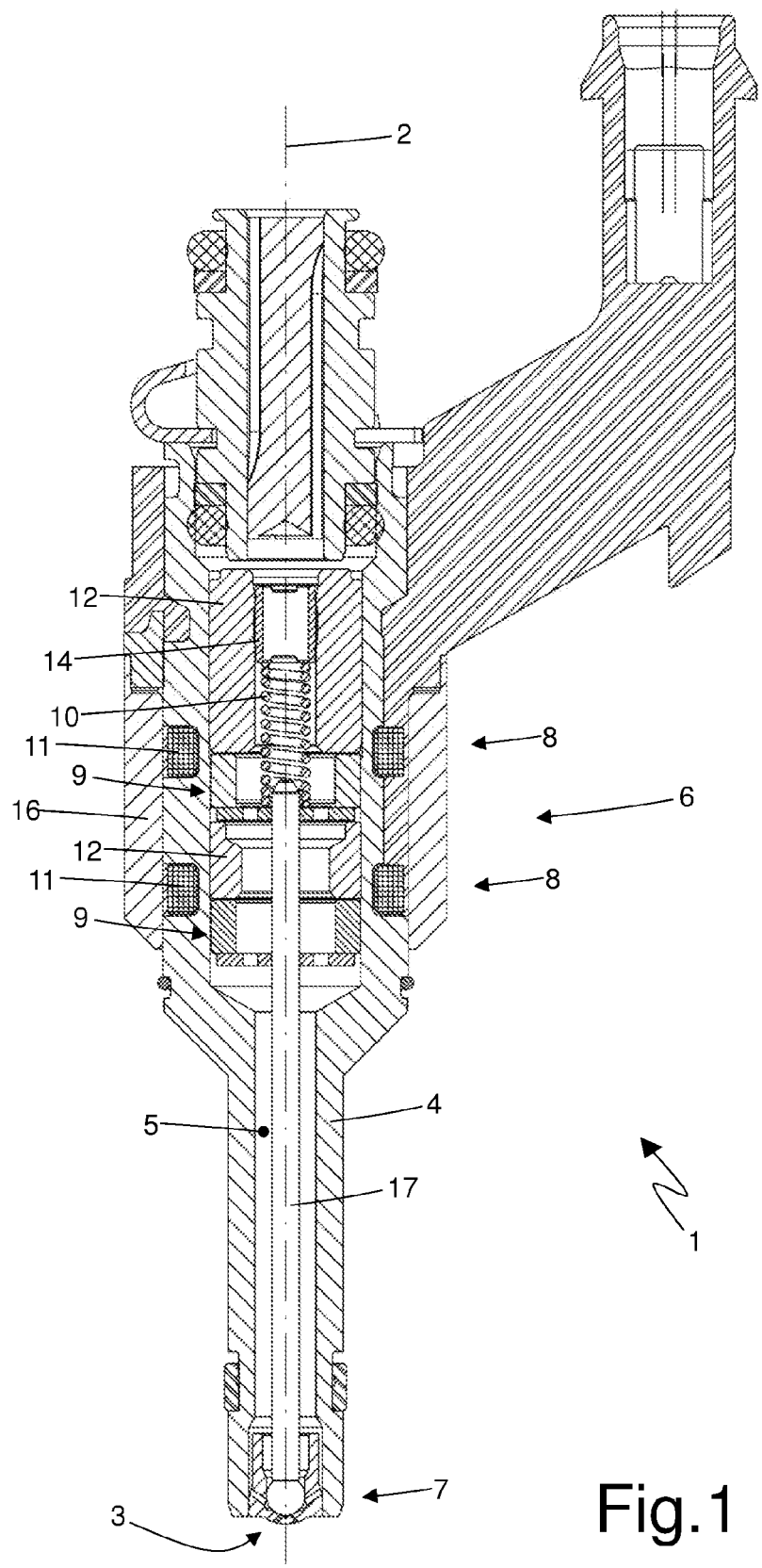
FIG. 1 shows a longitudinal section of a fuel injector of the present invention.

In FIG. 1, reference numeral 1 generally indicates a fuel injector, which has a substantially cylindrical symmetry about a longitudinal axis 2 and is adapted to be controlled to inject fuel from an injection nozzle 3 which leads into a combustion chamber of an engine cylinder. The injector 1 includes a supporting body 4, which has a variable-section cylindrical tubular shape along the longitudinal axis 2, and has a feeding duct 5 extending along the length of the supporting body 4 to feed pressurized fuel towards the injection nozzle 3.

The supporting body 4 houses an electromagnetic actuator 6 at an upper portion thereof, and an injection valve 7 (shown in greater detail in FIG. 2) at a lower portion thereof. In operation, the injection valve 7 is actuated by the electromagnetic actuator 6 to adjust the fuel flow through the injection nozzle 3, obtained at the injection valve 7.

Figure 3:
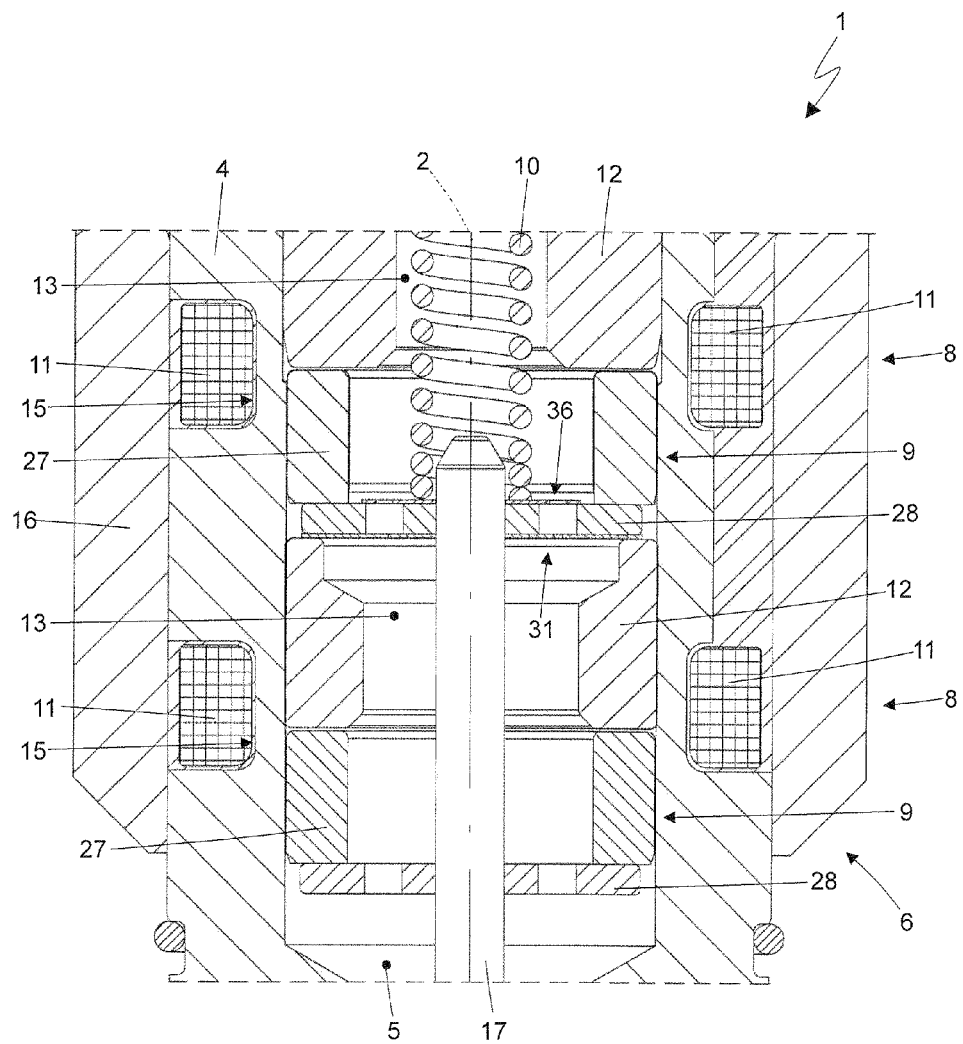
FIG. 3 is an enlarged view of an electromagnetic actuator of the injector of FIG. 1.

As shown in FIG. 3, the electromagnetic actuator 6 includes a pair of twin electromagnets 8 (upper and lower electromagnets, respectively), which are activated together to work simultaneously. When energized, each electromagnet 8 is adapted to move a respective plunger 9 made of ferromagnetic material along the axis 2, from a closing position to an opening position of the injection valve 7 against the bias of a single, common closing spring 10 which tends to hold plunger 9 in the closing position of the injection valve. Each electromagnet 8 includes a coil 11 (which is electrically controlled by a control unit and is housed outside the supporting body 4) and a magnetic armature 12 or magnetic pole 12 (which is housed within the supporting body 4 and has a central hole 13 to allow the fuel to flow towards the injection nozzle 3). A catch body 14 (see FIG. 1), which has a tubular cylindrical shape (possibly open along a generating line) to allow the fuel to flow towards the injection nozzle 3. The catch body 14 is adapted to maintain the common spring 10 compressed against the plunger 9 of the upper electromagnet 8, and driven in fixed position into the central hole 13 of the magnetic armature 12 of the upper electromagnet 8.

Each coil 11 is wound directly inside an annular slot 15 formed in the outer surface of the supporting body 4. Each coil 11 includes an enameled conductor wire having a self-bonding paint. He conducting wire has a small axial dimension (for example, a dimension measured along the longitudinal axis 2) so as to minimize the dispersed magnetic fluxes. At the coils 11, a protection body 16 is coupled about the supporting body 4. The protection body 16 has a tubular shape and is used to ensure suitable mechanical protection to the coils 11 so as to allow the magnetic flux lines generated by the coils 11 to be closed, and so as to increase the mechanical strength of the supporting body 4 at structural weak points introduced by the presence of the slots 15.

The plungers 9 form part of a movable equipment, which includes a shutter or needle 17 having an upper portion integral with each plunger 9, and a lower portion cooperating with a valve seat 18 (shown in FIG. 2) of the injection valve 7 to adjust the fuel flow through the injection nozzle 3.

In operation, when the electromagnets 8 are de-energized, each plunger 9 is not attracted by its magnetic armature 12 and the elastic bias of spring 10 pushes the plungers 9, together with the needle 17, downwards. In this situation, the injection valve 7 is closed. When the electromagnets 8 are energized, however, each plunger 9 is magnetically attracted by its magnetic armature 12 against the elastic bias of spring 10, whereby and the plungers 9, together with the needle 17, move upwards to cause the injection valve 7 to open.

In order to accurately determine the upward stroke of needle 17, the plunger 9 of the upper electromagnet 8 has a shorter effective stroke than that of the plunger 9 of the lower electromagnet 8. In this way, when the electromagnets 8 are energized, only the plunger 9 of the upper electromagnet 8 comes into contact with its magnetic armature 12, regardless of manufacturing tolerances. In order to limit the effective stroke of the plunger 9 of the upper electromagnet 8, either the lower surface of armature 12 or the upper surface of plunger 9 is coated with a layer of hard, non-ferromagnetic metal material, such as chromium. Thus, the thickness of the chromium layer determines the reduction of the effective stroke of the plunger 9 of the upper electromagnet 8. Moreover, the chromium layer increases the shock resistance of the zone and helps avoid magnetic sticking phenomena (due to a direct contact between the ferromagnetic material of plunger 9 and the ferromagnetic material of armature 12). Specifically, the chromium layer defines a gap that prevents the magnetic attraction forces (caused by the residual magnetism between plunger 9 and armature 12) from reaching specific high values (for example, higher than the elastic bias generated by spring 10).

Furthermore, only the plunger 9 of the upper electromagnet 8 is subjected to mechanical precision machining to ensure a calibrated outer diameter substantially equal (obviously by defect) to the inner diameter of the feeding channel 5. The plunger 9 of the lower electromagnet 8, however, has a non-calibrated outer diameter that is smaller than the inner diameter of the feeding channel 5. In this way, only the plunger 9 of the upper electromagnet 8 serves the function of guiding the needle 17 so as to control the axial sliding of the needle 17 along the longitudinal axis 2. This arrangement reduces manufacturing costs because only the plunger 9 of the upper electromagnet 8 needs to be subjected to costly precision machining operations.

Figure 2:
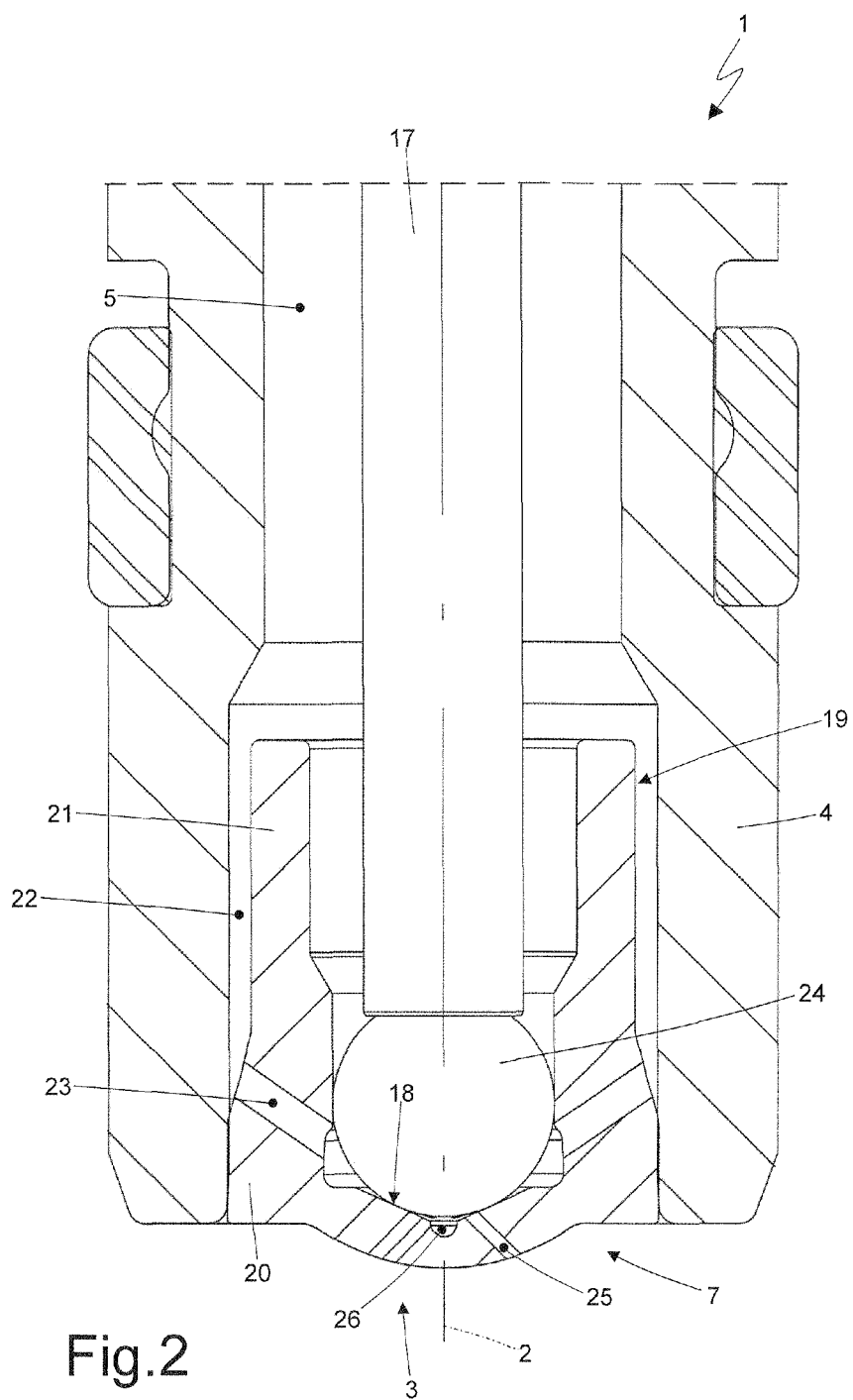
FIG. 2 is an enlarged view of an injection valve of the injector of FIG. 1.

A shown in FIG. 2, the valve seat 18 is defined in a sealing element 19, which is monolithic, seals the bottom of the feeding channel 5 of the supporting body 4, and is crossed by the injection nozzle 3. In particular, the sealing element 19 includes a disc-shaped capping element 20 which seals the bottom of the feeding channel 5 of the supporting body 4 and is crossed by the injection nozzle 3. A guiding element 21 rises from the capping element 20, has a tubular shape, houses a needle 17 therein for defining a lower guide of the needle 17 itself, and has an outer diameter which is smaller than the inner diameter of the feeding channel 5 of the supporting body 4, so as to define an outer annular channel 22 through which the pressurized fuel can flow.

Figure 4:
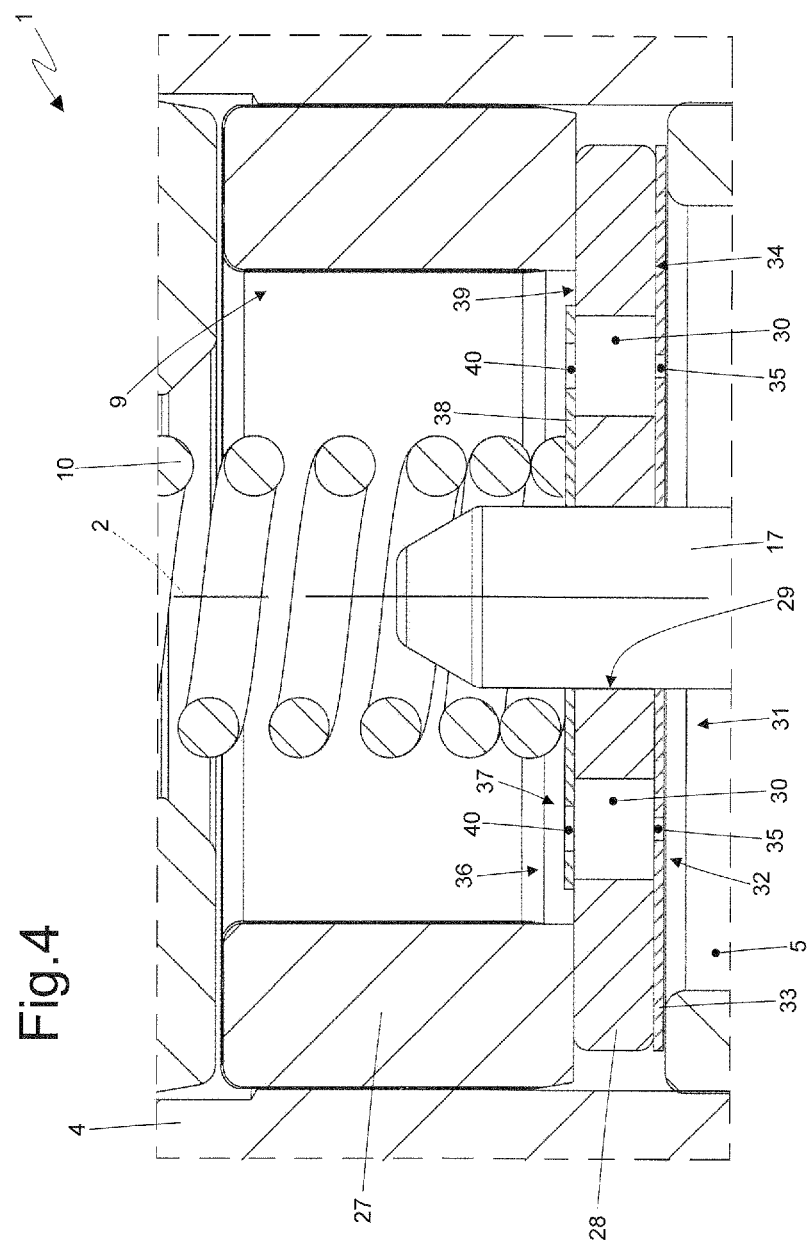
FIG. 4 is an enlarged view of a plunger of an upper electromagnet of the electromagnetic actuator of FIG. 3.

A set of four through feeding holes 23 (two of which are shown in FIG. 2), which lead towards the valve seat 18 to allow the flow of pressurized fuel towards the valve seat 18 itself, are obtained in the lower part of the guiding element 21. The feeding holes 23 may be either offset with respect to the longitudinal axis 2 so as not to converge towards the longitudinal axis 2 and to create a vortex pattern to the respective fuel flows, or the feeding holes 23 may converge towards the longitudinal axis 2. As shown in FIG. 4, the feeding holes 23 are arranged at an 80° angle (generally from 70° to 90°) with the longitudinal axis 2. In one embodiment, the feeding holes 23 form a 90° angle with the longitudinal axis 2.

The needle 17 ends with a substantially spherical shutter head 24 adapted to rest against the valve seat 18 fluid-tight. In one embodiment, the shutter head 24 has a substantially cylindrical shape and the abutment zone has a spherical shape. Furthermore, the shutter head 24 rests slidingly on an inner surface 21 of the guiding element 29 so as to be guided in its movement along the longitudinal axis 2. The injection nozzle 3 is defined by a plurality of injection through holes 25 obtained from an injection chamber 26 arranged downstream of the valve seat 18.

As shown in FIG. 4, each plunger 9 includes an annular (tubular) element 27 and a discoid element 28, which closes the bottom of the annular element 27 and has a central through hole 29 adapted to receive a portion of the needle 17 and a plurality of peripheral feeding through holes 30 (two of which are shown in FIG. 4) adapted to allow the fuel to flow towards the injection nozzle 3. The needle 17 is integral with the discoid element 28 of each plunger 9 with an annular weld that surrounds the central hole 29. A central portion of the discoid element 28 of the plunger 9 of the upper electromagnet 8 abuts against a lower end of spring 10.

As mentioned above, the outer diameter of the annular element 27 of the plunger 9 of the upper electromagnet 8 is substantially the same as the inner diameter of the corresponding portion of the feeding channel 5 of the supporting body 4. In this way, the plunger 9 can slide with respect to the supporting body 4 along the longitudinal axis 2, but cannot perform any movement transverse to the longitudinal axis 2 with respect to the supporting body 4. Because the needle 17 is firmly connected to the plunger 9 of the upper electromagnet 8, the plunger 9 also serves the function of upper guide of the needle 17. As such, the needle 17 is guided by the plunger 9 of the upper electromagnet 8 on the top and by the guiding element 21 at the bottom.

A hydraulic type anti-rebound device 31, adapted to attenuate the bouncing of the shutter head 20 of the needle 17 against the valve seat 18 when the needle 17 moves from the opening position to the closing position of the injection valve 7, is connected to the lower face of the discoid element 28 of the plunger 9. The anti-rebound device 31 includes a plurality of valve elements 32, each of which is coupled to a respective peripheral feeding hole 30 of the plunger 9 and has a different permeability to the passage of fuel as a function of the passage direction of the fuel through the feeding hole 30. In particular, each valve element 32 includes an elastic blade 33, which is partially fixed to a lower surface 34 of the plunger 9 on one side of the respective feeding hole 30 and has a small-sized calibrated hole 35 aligned with the feeding hole 30 itself. When the fuel flows downwards (for example, towards the injection nozzle 3), the blade 33 is deformed under the bias of the fuel and leaves the fuel passage through the feeding hole 30 substantially free. When the fuel flows upwards, the blade 33 adheres to the lower surface 34 of the plunger 9 under the bias of the fuel, thus closing the feeding hole 30 and allowing the fuel to pass through its small-sized calibrated hole 35 only. In other words, the anti-rebound device 31 forms a system for asymmetrically damping the kinetic energy of the plunger 9 of the upper electromagnet 8.

The blade 33 of the anti-rebound device 31 is calibrated so as to adhere to the lower surface 34 of the plunger 9 only when the needle 17 is close to the closing position. In this way, the anti-rebound device 31 slows down the closing movement of the needle 17 only just before the impact of the needle 17 against the valve seat 18 and not along the whole closing stroke. By virtue of the slowing action exerted by the anti-rebound device 31, the needle 17 is slowed down just before impacting against the valve seat 18, and thus the elastic bouncing of the needle 17 against the valve seat 18 is greatly reduced. In order to achieve this result, the blade 33 of the anti-rebound device 31 is dimensioned to be relatively rigid and heavy, and thus have a higher mechanical inertia. Thus, the blade 33 of the anti-rebound device 31 is relatively thick. By virtue of the relatively high mechanical inertia of the blade 33 of the anti-rebound device 31, the intervention of the anti-rebound device 31 is delayed with respect to the beginning of the step of closing the injection valve 7, and thus the anti-rebound device 31 only intervenes when the needle 17 is about to impact against the valve seat 18.

Specifically, the anti-rebound device 31 hydraulically dissipates more kinetic energy when the needle 17 moves towards the closing position of the injection valve 7 than when the needle 17 moves towards the opening position of the injection valve 7. Such an effect is achieved because each valve element 34 of the anti-rebound device 31 has a different permeability to the passage of fuel as a function of the passage direction of the fuel through the feeding hole 30, so as to have a lower permeability to the passage of fuel when the needle 17 moves towards the closing position of the injection valve 7, and a higher permeability to the passage of fuel when the needle 17 moves towards the opening position of the injection valve 7.

A hydraulic type braking device 36 adapted to slow down the opening movement of needle 17 (for example, the movement with which the needle 17 moves from the closing position to the opening position of the injection valve 7) is connected to the upper face of the discoid element 28 of the plunger 9 of the upper electromagnet 8 (for example, on the opposite side with respect to the anti-rebound device 31). The braking device 36 includes respective valve elements 37, each of which is coupled to a respective peripheral feeding hole 30 of the plunger 9, and has a different permeability to the passage of fuel as a function of the passage direction of the fuel through the feeding hole 30. In particular, each valve element 37 includes an elastic blade 38, which is partially fixed to an upper surface 39 of the plunger 9 only on one side of the respective feeding hole 30, and has a small-sized calibrated hole 40 aligned with the feeding hole 30. When needle 17 moves downwards (for example, when needle 17 moves from the opening position to the closing position), the blade 38 is deformed under the bias of the fuel and leaves the passage of fuel through the feeding hole 30 substantially free, while when the needle 17 moves upwards (for example, when needle 17 moves from the closing position to the opening position), the blade 33 adheres to the upper surface 39 of the plunger 9 under the bias of the fuel, thus closing the feeding hole 30 and allowing the fuel to pass only through its small-sized calibrated hole 40. Thus, the braking device 36 forms a device for asymmetrically damping the kinetic energy possessed by the plunger 9 of the upper electromagnet 8.

Specifically, the braking device 36 hydraulically dissipates more kinetic energy when the needle 17 moves towards the opening position of the injection valve 7 than when the needle 17 moves towards the closing position of the injection valve 7, so as to slow down the opening stroke of the needle 17 when the needle 17 moves towards the opening position of the injection valve 7. Such an effect is achieved because each valve element 37 of the braking device 36 has a lower permeability to the passage of the fuel when the needle 17 moves towards the opening position of the injection valve 7, and a higher permeability to the passage of the fuel when the needle 17 moves towards the closing position of the injection valve 7.

When the injection valve 7 is closed, there is a force of hydraulic nature which pushes on the shutter head 24 and maintains the shutter head 24 in the closing position. Therefore, in order to open the injection valve 7, the electromagnetic actuator 6 needs to generate a force on the needle 17 to overcome the force added to the elastic bias exerted by the closing spring 10. However, the force suddenly disappears as soon as the injection valve 7 opens, and thus the injection valve 7 tends to open very quickly and violently with an extremely fast upward movement of the needle 17. When the injection valve 7 opens and the force suddenly disappears, the action of the braking device 36 slows down the opening movement (for example, the upward movement) of the needle 17, because it determines a hydraulic dissipation of part of the kinetic energy possessed by the needle 17. Such a slowing action determined by the braking device 36 is particularly valuable, because it prevents the injection valve 7 from opening very quickly and violently with an extremely fast upward movement of needle 17. Essentially, because of the presence of the braking device 36, the opening of the injection valve 7 is slowed down to the benefit of greater controllability (for example, better accuracy and repeatability) of the fuel injection in the ballistic zone of the injection law (for example, the law which relates the actuation time, for example, the control time, to the injected fuel amount). Specifically, the action of the braking device 36 stabilizes the initial part (the ballistic zone) of the injection law.

The blade 38 of the braking device 36 is calibrated so as to have a low mechanical inertia to allow a nearly instantaneous intervention of the braking device 36 as soon as the injection valve 7 starts opening. Indeed, the braking device 36 must intervene more quickly as soon as the injection valve 7 starts opening. To this end, the blade 38 of the braking device 36 is dimensioned to be very flexible and light in weight, and thus to have a low mechanical inertia. Thus, the blade 38 of the braking device 36 is relatively thin. Because of the low mechanical inertia of the blade 38 of the braking device 36, the intervention of the braking device 36 is nearly simultaneous to the beginning of the step of opening of the injection valve 7.

It will be appreciated hat the mechanical inertia of the braking device 36 (for example, of the blade 38 of the braking device 36) is lower than the mechanical inertia of the anti-rebound device 31 (for example, of the blade 33 of the anti-rebound device 31), because the braking device 36 must intervene instantaneously, while the anti-rebound device 31 must intervene with a given delay.

Figure 5:
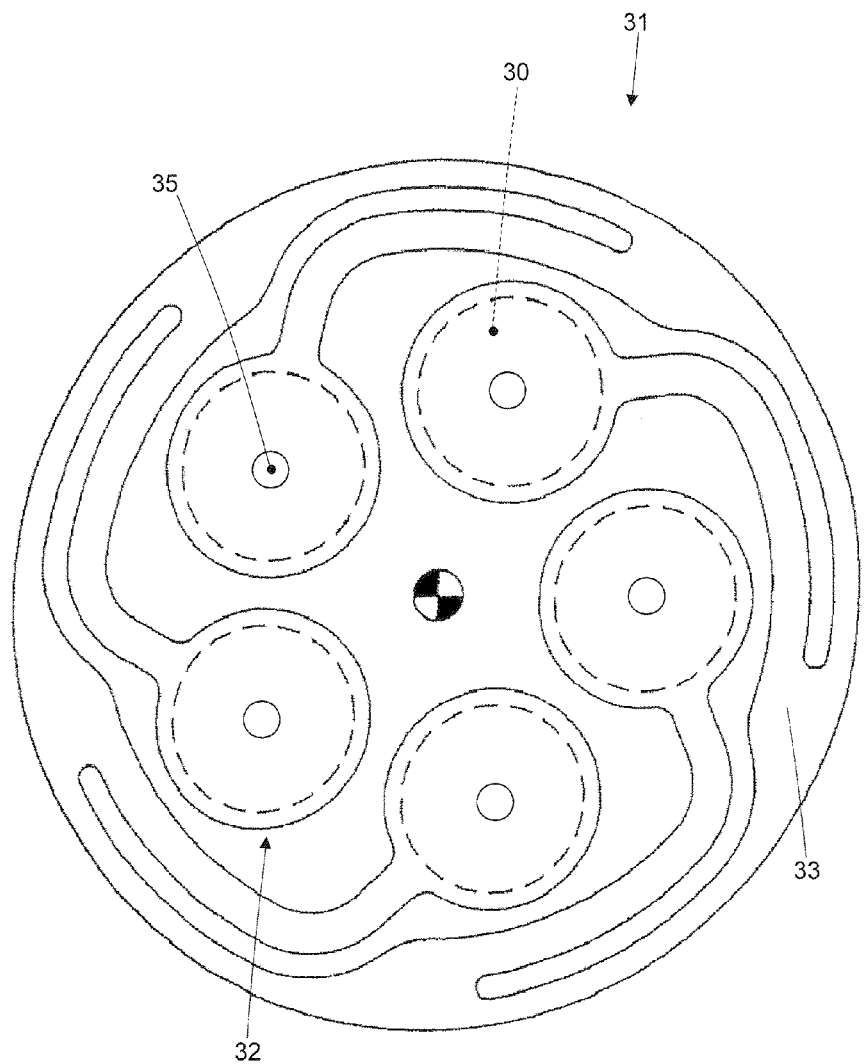
FIG. 5 is a plan view of an anti-rebound device coupled to a lower face of the plunger of FIG. 4.

As shown in FIG. 5, the elastic blade 33 of the anti-rebound device 31 is fixed to the discoid element 28 at a peripheral edge thereof and is provided with a series of petals, each of which is coupled to a respective feeding hole 30 and has a calibrated hole 35 in the center. Each petal of the elastic blade 33 is normally arranged in a closing position of the feeding hole 30 and is movable, during the opening stroke of the piston 21, from the closing position to an opening position of the feeding hole 30 itself. The elastic blade 33 includes an outer crown, which is fixed to the lower surface 34 of the discoid element 28 by a weld (for example, a spot laser weld). The petals extend inwards from the crown, with each petal having a circular sealing element (in the center of which a calibrated hole 35 is obtained) connected to the crown by a thin shaft (for example, having a length much longer than the width) in order to be elastically deformed.

Figure 6:
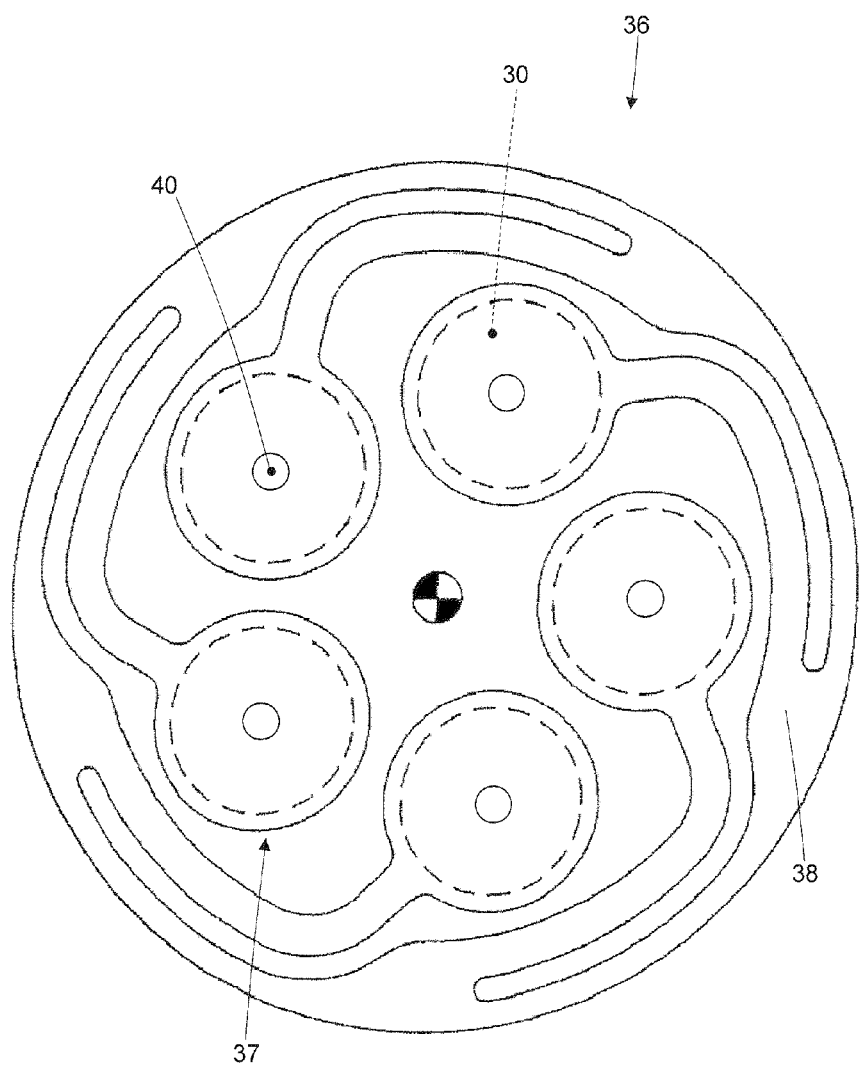
FIG. 6 is a plan view of a braking device coupled to an upper face of the plunger of FIG. 4.

As shown in FIG. 6, the elastic blade 38 of the braking device 36 is fixed to the discoid element 28 at a peripheral edge thereof and is provided with a series of petals, each of which is coupled to a respective feeding hole 30 and has a calibrated hole 40 in the center. Each petal of the elastic blade 38 is normally arranged in a closing position of the feeding hole 30 and is movable, during the closing stroke of piston 21, from the closing position to an opening position of the feeding hole 30 itself. The elastic blade 38 includes an outer crown, which is fixed to the upper surface 39 of the discoid element 28 by a weld (for example, a spot laser weld). The petals extend inwards from the crown, with each petal having a circular sealing element (in the center of which a calibrated hole 40 is obtained) connected to the crown by a thin shaft (for example, having a length much longer than the width) in order to be elastically deformed.

In the embodiment shown throughout the figures, the plunger 9 of the upper electromagnet 8 is the only upper guide of the needle 17 and supports both the anti-rebound device 31 and the braking device 36. The devices 31 and 36 may be coupled to the plunger 9 of the upper electromagnet 8, as the plunger 9 provides a better lateral hydraulic sealing with respect to the inner surface of the feeding channel 5 (for example, lesser lateral leakages of fuel) and thus provides better operation of the devices 31 and 36 themselves. In one embodiment, the plunger 9 of the lower electromagnet 8 could form the only upper guide of the needle 17 and thus, the devices 31 and 36 would be coupled to the plunger 9 of the lower electromagnet 8. Moreover, in one embodiment, both plungers 9 could form the two upper guides of the needle 17 and thus, the devices 31 and 36 could be either coupled to the plunger 9 of the lower electromagnet 8 or to the plunger 9 of the upper electromagnet 8.

The needle 17 has a cylindrical symmetry shaft, to which the substantially spherical shutter head 24 is connected by an annular weld. Similarly, the shaft is connected to the discoid element 28 of each plunger 9 by an annular weld.

In this way, the injector 1 of the present invention provides many advantages. Firstly, the injector 1 has extremely high dynamic performance (for example, is capable of opening and closing the injection valve 7 very quickly) even when the fuel feeding pressure is high (even higher than 50 MPa) because of the use of two twin electromagnets 8 of relatively small size and having low mechanical and magnetic inertia. Furthermore, the injector 1 has a linear, uniform (for example, without irregularities) injection law (for example, the law which relates the driving time to the injected fuel amount), even for short driving times (for example, in the ballistic zone) and thus for small injected fuel amounts. Thus, the injector 1 allows injection of small fuel amounts in an accurate and repeatable manner. Moreover, the injector 1 is simple and cost-effective to manufacture, because no machining and/or assembly operations substantially different from those of a traditional electromagnetic fuel injector are required.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:
1. A fuel injector comprising:
   an injection nozzle;
   an injection valve having a movable needle to adjust the flow of fuel through the injection nozzle;
   an electromagnetic actuator to move the needle between a closing position and an opening position of the injection valve, having at least one electromagnet including a coil, a fixed magnetic armature, and a movable plunger, which is mechanically connected to the needle and has at least one feeding through hole for the passage of fuel towards the injection nozzle;

a closing spring which tends to hold the needle in the closing position; and a tubular supporting body having a central channel, which houses the fixed magnetic armature and the movable plunger;

wherein the plunger includes a hydraulic type braking device, which is coupled to the feeding hole and hydraulically dissipates more kinetic energy when the needle moves towards the opening position of the injection valve than when the needle moves towards the closing position of the injection valve so as to slow down the opening stroke of the needle, when the needle moves towards the opening position of the injection valve.

2. The injector as set forth in claim 1, wherein the braking device includes a first valve element, which is coupled to the feeding hole of the plunger and has a different permeability to the passage of fuel as a function of the passage direction of the fuel through the feeding hole so as to have a lower permeability to the passage of fuel when the needle moves towards the opening position of the injection valve and a higher permeability to the passage of fuel when the needle moves towards the closing position of the injection valve.

3. The injector as set forth in claim 2, wherein the first valve element includes a first elastic blade, which is partially fixed to an upper surface of the plunger and has a first small-sized calibrated hole, which is arranged at the feeding hole.

4. The injector as set forth in claim 1, wherein the plunger includes a hydraulic type anti-rebound device, which is coupled to the feeding hole, is arranged on the opposite side with respect to the braking device, and hydraulically dissipates more kinetic energy when the needle moves towards the closing position of the injection valve than when the needle moves towards the opening position of the injection valve.

5. The injector as set forth in claim 4, wherein the anti-rebound device includes a second valve element, which is coupled to the feeding hole of the plunger and has a different permeability to the passage of fuel as a function of the passage direction of the fuel through the feeding hole so as to have a higher permeability to the passage of fuel when the needle moves towards the opening position of the injection valve and a lower permeability to the passage of fuel when the needle moves towards the closing position of the injection valve (7).

6. The injector as set forth in claim 5, wherein the second valve element includes a second elastic blade, which is partially fixed to a lower surface of the plunger and has a second small-sized calibrated hole arranged at the feeding hole.

7. The injector as set forth in claim 4, wherein the mechanical inertia of the braking device is lower than the mechanical inertia of the anti-rebound device, so that the braking device intervenes before the anti-rebound device.

8. The injector as set forth in claim 1, wherein the plunger includes an annular element and a discoid element, which closes the bottom of the annular element and has a central through hole adapted to receive a portion of the needle and a plurality of peripheral feeding through holes adapted to allow the fuel to flow towards the injection nozzle.

9. The injector as set forth in claim 1, wherein an outer surface of the supporting body has at least one annular slot, wherein the coil of the electromagnet is directly wound inside the annular slot.

10. The injector as set forth in claim 9, further including a protection body, which has a tubular shape and is arranged about the supporting body at the coil.

11. The injector as set forth in claim 1, wherein the electromagnetic actuator includes two electromagnets axially arranged side by side.

12. The injector as set forth in claim 11, wherein the plunger of a first electromagnet has a shorter effective stroke than the effective stroke of the plunger of a second electromagnet.

13. The injector as set forth in claim 11, wherein only the plunger of the first electromagnet forms an upper guide of the needle.

* * * * *